A. J. BRAUER.
STRAP WORKING MACHINE.
APPLICATION FILED JULY 17, 1913.
1,272,612.
Patented July 16, 1918.
6 SHEETS—SHEET 1.
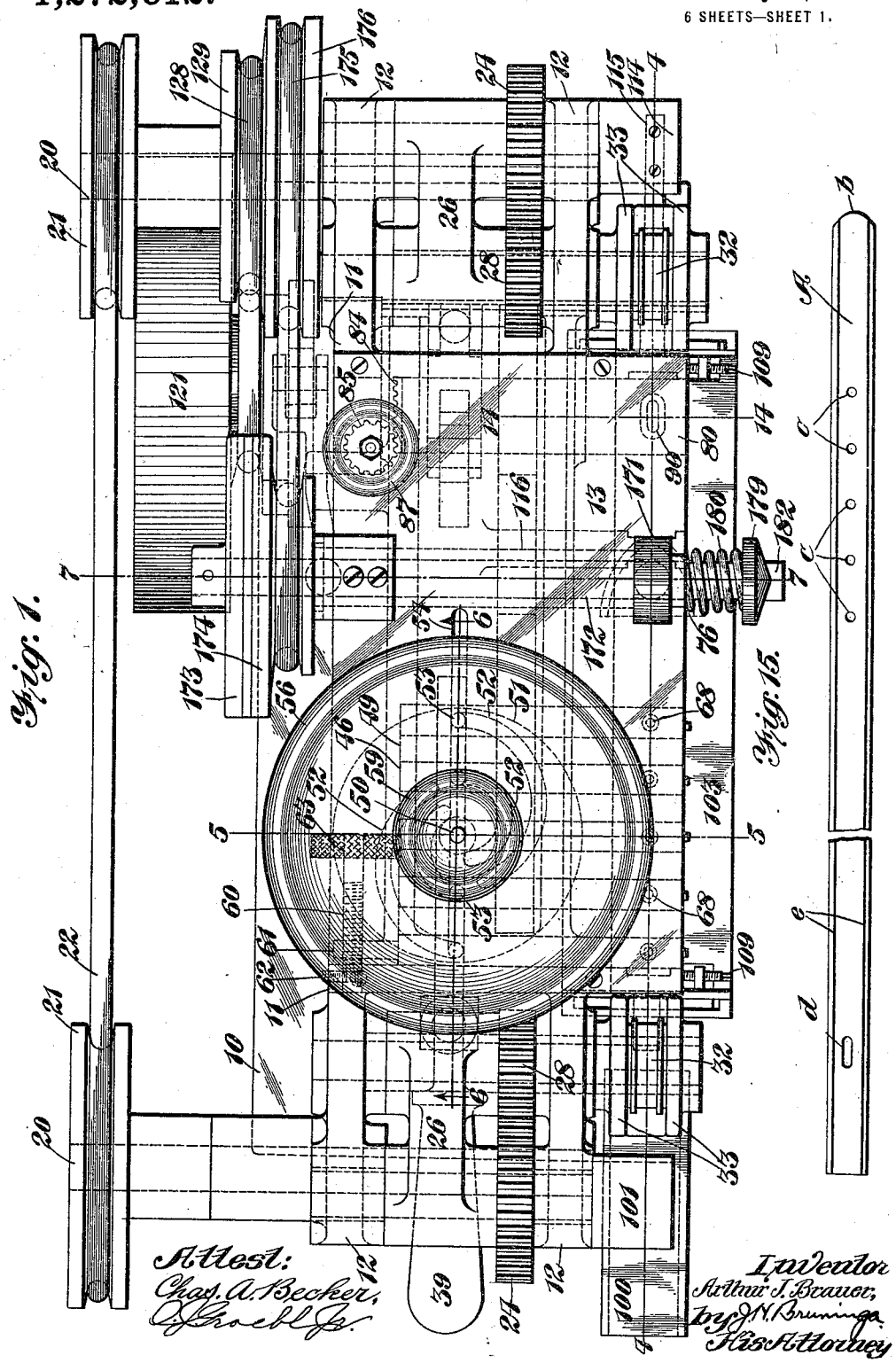

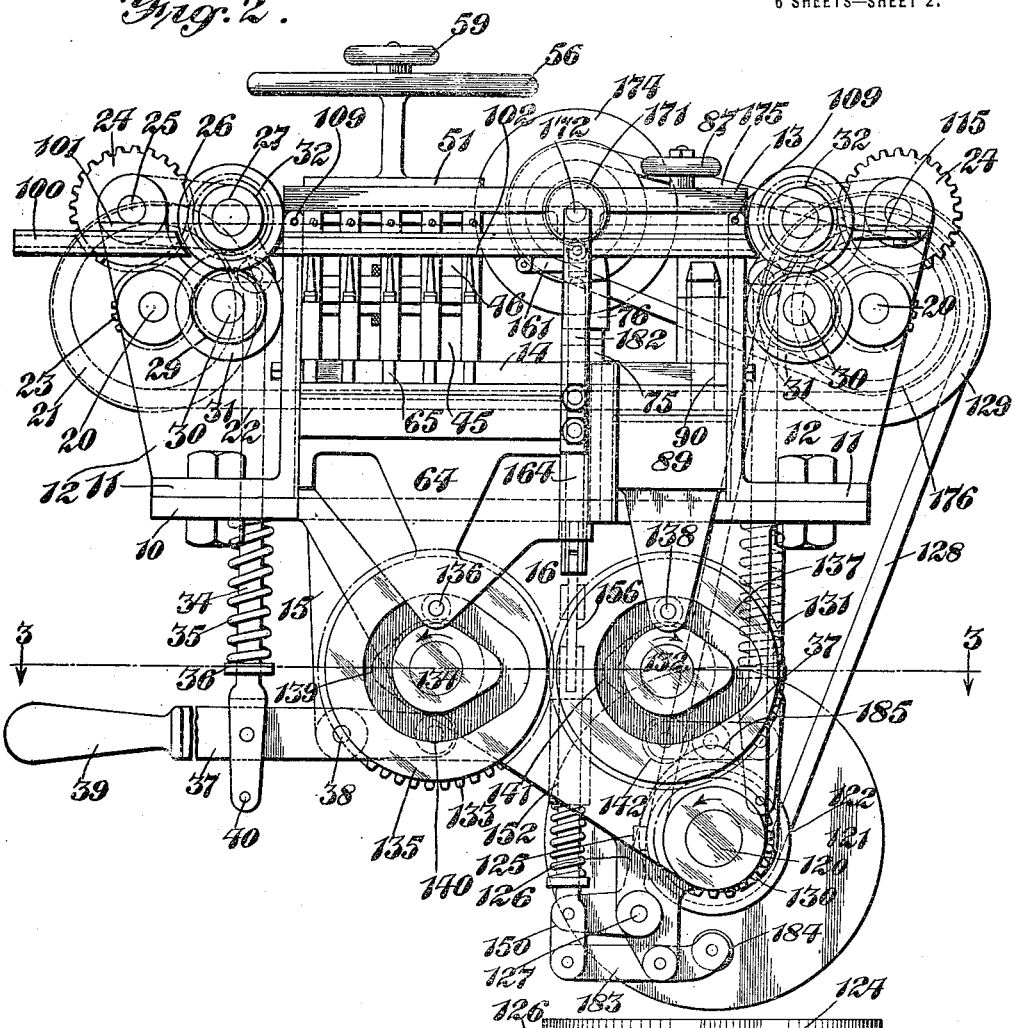

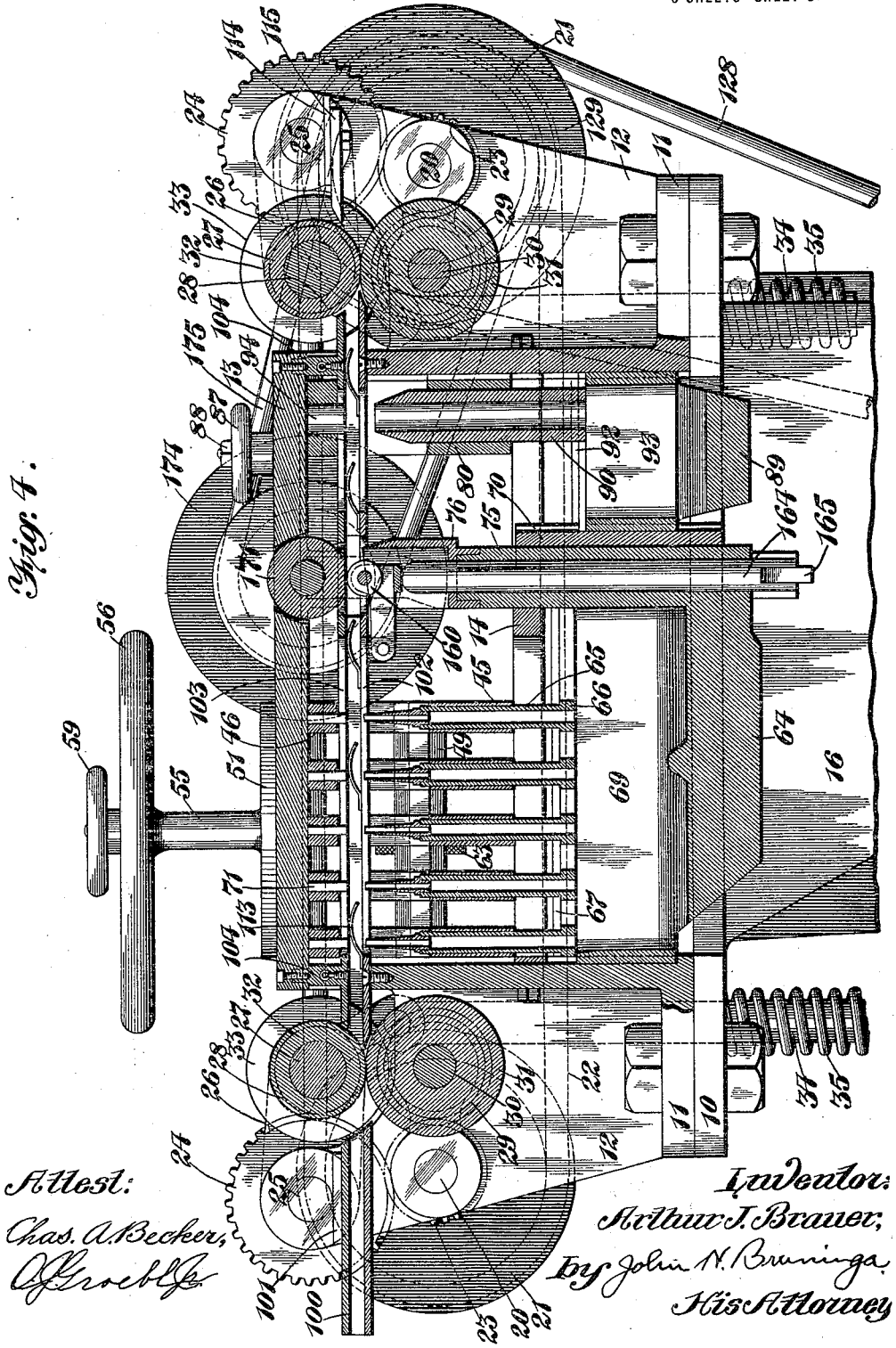

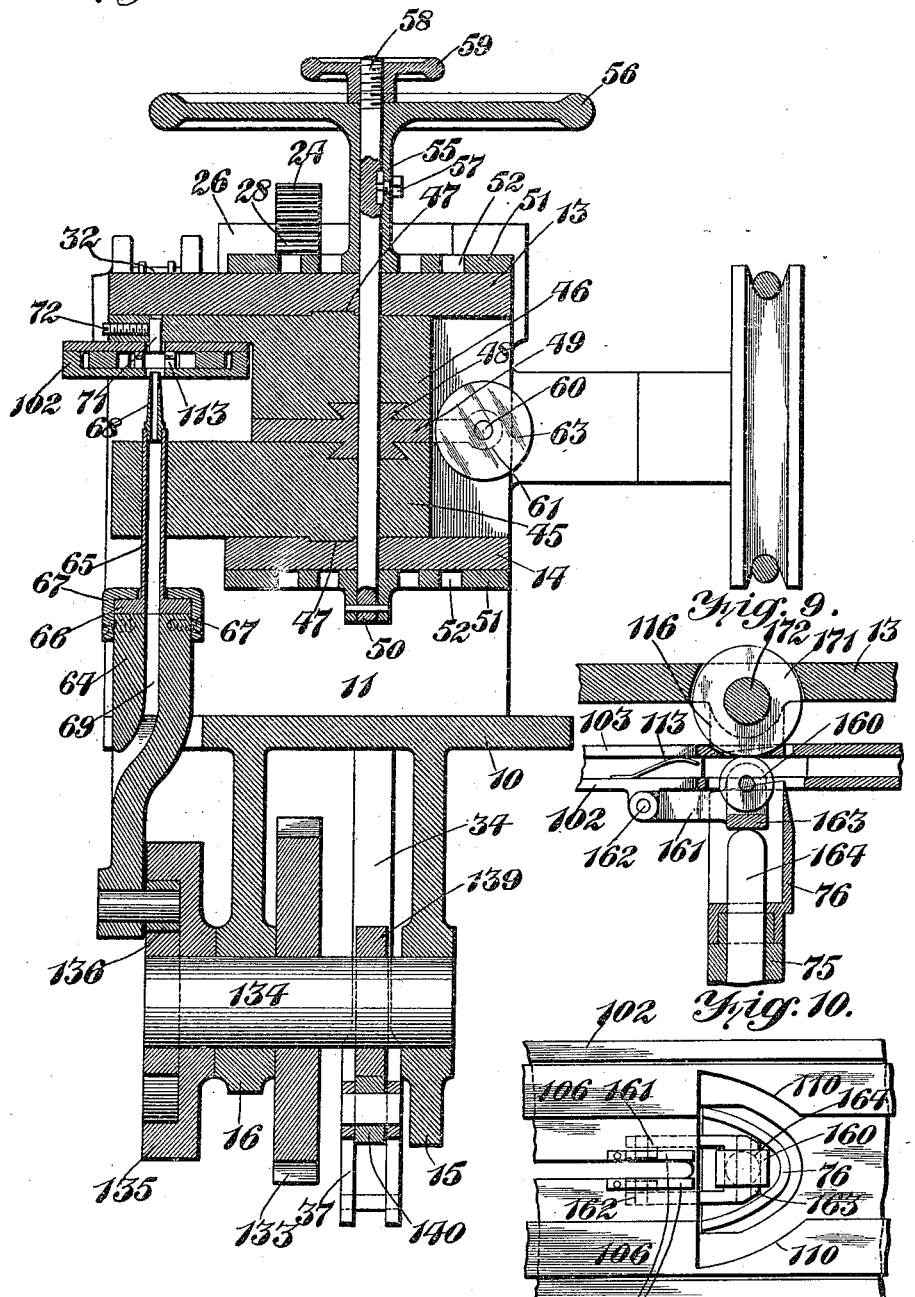

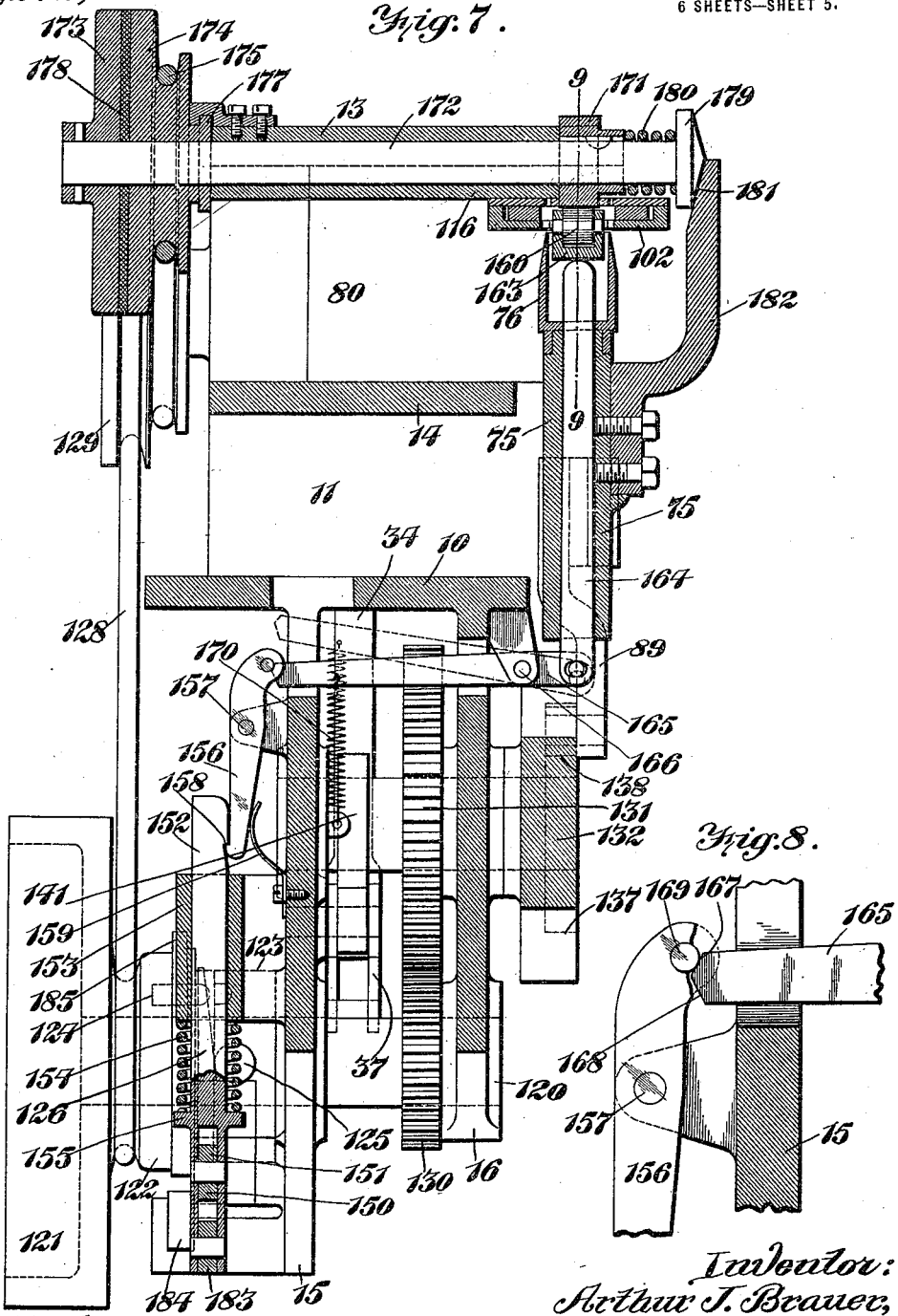

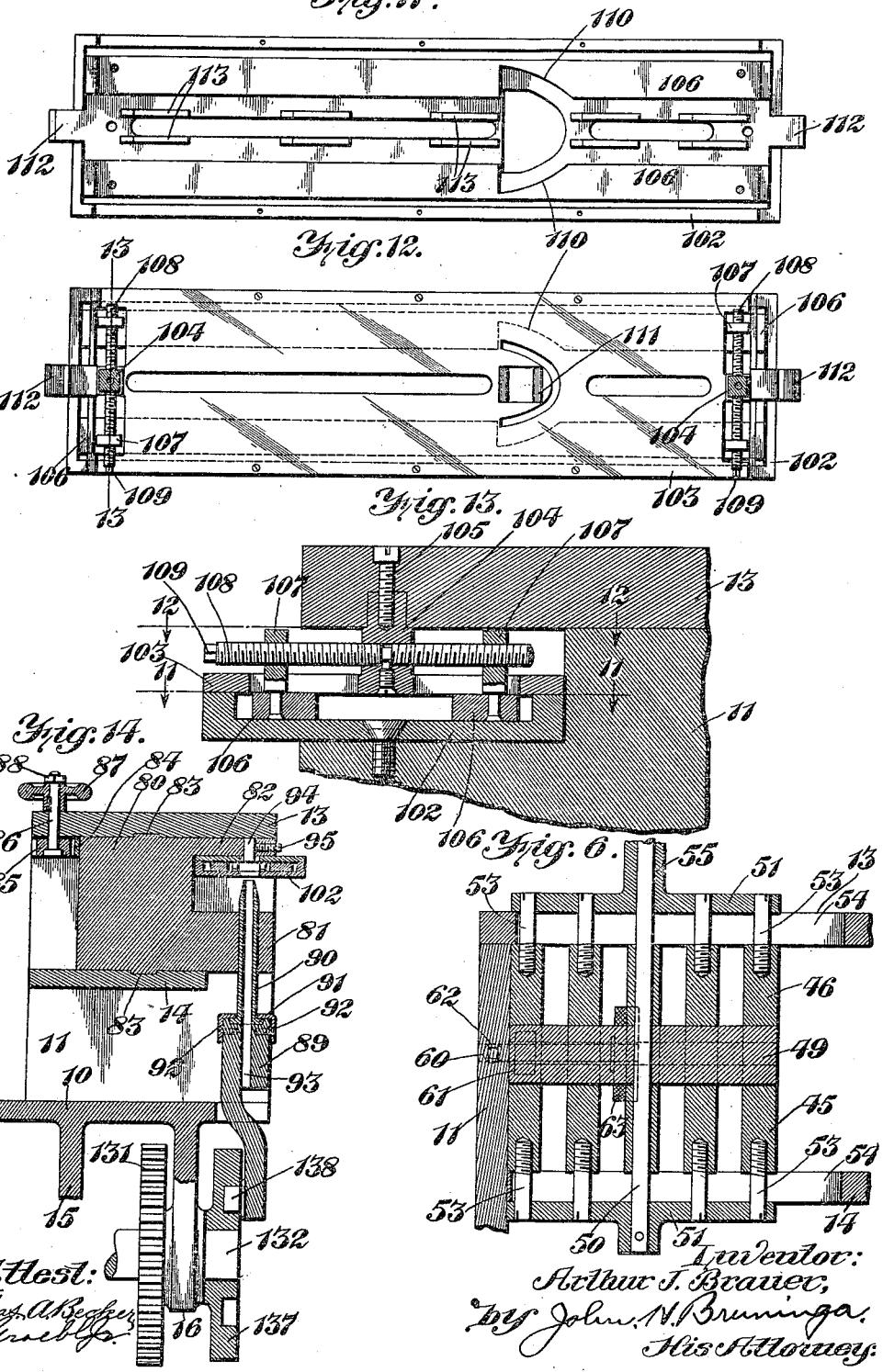

UNITED STATES PATENT OFFICE.

ARTHUR J. BRAUER, OF ST. LOUIS, MISSOURI.

STRAP-WORKING MACHINE.

1,272,612.  Specification of Letters Patent.  Patented July 16, 1918.

Application filed July 17, 1913. Serial No. 779,554.

*To all whom it may concern:*

Be it known that I, ARTHUR J. BRAUER, a citizen of the United States, and residing at St. Louis, in the State of Missouri, have invented certain new and useful Improvements in Strap-Working Machines, of which the following is a specification.

This invention relates to machines for working straps and the like. In the manufacture of straps, such as are used for dog collars, belts, etc., it is necessary to neatly trim the forward end, provide the forward end with spaced holes to receive the tongue of the buckle and provide the rear end, which is doubled over the buckle, with an elongated slot to pass over the tongue. Straps vary in length, width and thickness, and it is necessary to vary the distances of the apertures in the front end of the strap from the end thereof and also the spacing of these apertures. It is also necessary to vary the distance of the end slot from the rear end of the strap. It is however in some cases desirable, where straps of different lengths but of the same width are operated upon in succession, to space the holes and the slot in the front and rear end of the strap respectively, uniformly.

One of the objects of this invention therefore is to construct a machine which will perform a series of operations on a strap at predetermined positions with respect to the ends of the strap.

Another object is to construct such a machine in which the strap is fed endwise through the machine.

Another object is to provide a machine in which the operations are performed upon the strap in predetermined relations with respect to the ends of the strap, irrespective of the length of the strap.

Another object is to provide mechanism whereby the operations so performed may be varied.

Another object is to improve the machine as a whole and its individual mechanisms as to details of construction, and further objects will appear from the detail description taken in connection with the accompanying drawings, in which:

Figure 1 is a plan of a machine embodying this invention,

Fig. 2 is a side elevation,
Fig. 3 is a section on the line 3—3 Fig. 2,
Fig. 4 is a section on the line 4—4 Fig. 1,
Fig. 5 is a section on the line 5—5 Fig. 1,
Fig. 6 is a section on the line 6—6 Fig. 1,
Fig. 7 is a section on the line 7—7 Fig. 1,
Fig. 8 is a detail showing the tripping mechanism,
Fig. 9 is a section on the line 9—9 Fig. 7,
Fig. 10 is a plan view of Fig. 9, with parts removed,
Fig. 11 is a view of the strap guiding mechanism with parts removed, the view being taken on the line 11—11 Fig. 13,
Fig. 12 is a plan view of the strap guiding mechanism, the view being taken on the line 12—12 Fig. 13,
Fig. 13 is a section on the line 13—13 Fig. 12,
Fig. 14 is a section on the line 14—14 Fig. 1, and
Fig. 15 is a plan view of the strap as finished in this machine.

Referring to the drawings and more particularly to Fig. 15, A designates a strap which has its forward end trimmed or rounded as shown at $b$. The forward end has a series of apertures spaced predetermined distances from each other and spaced a predetermined distance from the forward end of the strap, and adapted to receive the tongue of the buckle. The rear end of the strap has an elongated slot $d$ spaced a predetermined distance from the rear end of the strap and adapted to take over the tongue of the buckle when this end is doubled over the buckle. The upper or finished face of the strap has formed thereon creases $e$ which run therealong.

The machine comprises a base plate 10 which has bolted thereto a pair of end brackets 11 which are provided with spaced webs 12 to form spaced bearings for shafts hereinafter to be described. A top plate 13 rests upon and is bolted to the brackets, and a plate 14 connects and is bolted to the brackets and is spaced from the base plate 10 and the top plate 13. The base plate 10 has formed thereon and projecting downwardly therefrom a pair of spaced brackets 15 and 16 which form the means for supporting the driving and controlling mechanism hereinafter to be described. The base plate 10 is adapted to be supported on a bench so that the mechanism above this plate will project above the bench, and the mechanism below this plate will project below the bench.

*Feeding and creasing mechanism.*—The machine is provided with two sets of feeding and creasing rolls, and since these sets are identical only one will be described in detail. Referring to Figs. 1 to 4 inclusive, 20 designates a shaft supported on the bracket 11 and provided with a belt pulley 21 connected by a belt 22 with a pulley on the corresponding shaft. The shaft 20 has secured thereto a gear 23 meshing with a gear 24 loosely mounted on a shaft 25 mounted to rock in the bracket 11. This shaft 25 has rigidly connected thereto an arm 26 supporting a shaft 27 provided with a gear 28 meshing with the gear 24. A gear 29 on a shaft 30 supported in the bracket 11 meshes with the gear 23. The shaft 30 has mounted thereon a creasing roll 31 coöperating with a creasing roll 32 on the shaft 27, and the creasing roll 32 has end flanges 33 embracing the roll 31. By means of this construction the creasing roll 32 is guided in its movements toward and from the creasing roll 31. The arm 26 has jointed thereto a vertical rod 34 extending through the base plate 10 and having a spring 35 thereon bearing at one end against the base plate and at the other end against the collar 36 on the rod. The rod 34 is joined to a lever 37 pivoted at 38 on the bracket 15 and having a handle 39. The rod also has an extension 40 whereby it may be connected to a treadle (not shown). The spring 35 operates to retain the movable creasing roll in engagement with the stationary creasing roll, and the movable creasing roll may be raised at pleasure by the handle 39 or the treadle. The creasing rolls are of well known construction and need not be described in detail. These creasing rolls are generally furnished in sets for different width straps and for different forms of creases and are arranged to be removed from and replaced on the shafts 27 and 30.

*The multiple punch.*—Referring now to Figs. 1, 2, 4, 5 and 6, 45 and 46 designate a pair of blocks adapted to receive a punch and anvil respectively. The machine is provided with a series of these pairs or sets of blocks (in this case five), so as to provide a plurality of sets of punches to punch a plurality of holes. The blocks are guided on the plates 13 and 14 by means of ribs 47 engaging corresponding channels extending along the plates. The inside faces of the blocks are dove-tailed to slide on dove-tailed ribs 48 on a plate or slide 49. A vertical shaft 50 extends through the plates 13 and 14, the center blocks and the slide 49. A pair of disks or plates 51 are secured to the shaft 50, and these disks are provided with spiral cam slots 52 adapted to engage pins 53 fixed on the blocks 45 and 46 and sliding in slots 54 in the plates 13 and 14. The upper disk 51 has a hub 55 provided with a hand wheel 56, and this hub receives a set screw 57 coöperating with a key-way in the shaft 50, thereby permitting a slight play between the shaft and the disk. The upper end of the shaft 50 is threaded as shown at 58 and is provided with a clamping wheel 59. A screw shaft 60 extends through a tapped hole in a lug 61 extending rearwardly from the slide 49, and the end of the screw 60 is rotatably retained in the bracket 11 by means of a screw 62 engaging a circumferential recess in the end of the screw 60, while the other end of the screw shaft 60 has a knurled head 63.

A carrier 64 is mounted in guideways in the bracket 11 and a lug 70 projecting from the base plate 10, and this carrier is adapted to receive the punches 65. These punches project through and are guided by apertures in the blocks 45, and are provided with T shaped heads 66 retained in position on the carrier 64 by flanged plates 67 screwed to the carrier and forming a guideway. The punches have removable hardened points 68 and these punches are hollow as shown. The carrier 64 is provided with a recess 69 open at the top and bottom so that the punchings may be discarded. The blocks 46 receive anvils 71 which are retained in position by set screws 72, and these anvils may be of some soft metal such as brass or copper, or may be sleeves filled with leather as is usual in punch constructions.

In order to adjust the pairs of punches and anvils toward and from each other, the clamping wheel 59 is loosened, and by then turning the hand wheel 56 the outside pairs of blocks 45 and 46 can be moved toward and from the center pair of blocks. The pairs or sets of punches and anvils can therefore be simultaneously adjusted toward and from each other in a straight line. After the punches and anvils have been so adjusted they may be locked in adjusted position by the clamping wheel 59. The set of multiple punches and dies can be adjusted collectively or as a whole longitudinally of the machine by rotation of the knurled head 63. The clamping wheel 59 will securely hold the punches in adjusted position against individual or collective movement. Since the punches and anvils are moved by disks 51 of the same construction, the cam grooves 52 in these disks may be formed in duplicate by any well known duplicating construction as by a single set of multiple punches and dies. The punches and anvils will therefore remain in accurate alinement. It will therefore be seen that adjustment of the hand wheel 56 will vary the spacing of these punches, while adjustment of the head or hand wheel 63 will vary the position of the multiple punch.

*The end trimming mechanism.*—The carrier 64 has formed thereon a post or carrier 65 which has secured thereto a cutter 76. The outline of this cutter is shown in Fig. 10 and this outline is such as to trim the ends of straps of different widths. The cutter coöperates with a suitable die hereinafter to be described. The cutter being mounted on the same carrier as the punches is operated simultaneously therewith.

*The rear end slotting mechanism.*—Referring now to Figs. 1, 2, 4, and 14, 80 designates a block which is recessed at its forward end to provide projecting punch and anvil supports 81 and 82 respectively. This block is provided with ribs 83 engaging the channels extending along the plates 13 and 14. The block is provided with a rack 84 meshing with a gear 85 rigidly secured to a shaft 86 extending through the plate 13 and having splined thereon a hand wheel 87 secured by a nut 88. A carrier 89 is mounted in guideways in the bracket 11 and the lug 70, and this carrier receives a punch 90 having a T shaped head 91 engaging a slideway on the carrier and secured in position by means of flanged plates 92. The punch 90 is hollow and the carrier 89 is recessed as shown at 93 to discard the punchings. The support 82 has mounted therein an anvil 94 secured in position by a set screw 95. The block 80 may be adjusted longitudinally of the machine by turning the hand wheel 87, and locked in position by the clamping nut 88.

*The strap guiding mechanism.*—Referring now to Figs. 1, 2, 4, 11, 12 and 13, 100 designates a tube of rectangular cross section supported from a lug 101 on the bracket 11. This tube guides the strap to the first pair of creasing rolls and is sufficiently large to take the widest and the thickest strap. A guide tube of rectangular section extends between the sets of creasing rolls. This tube comprises a body part 102 of channeled section closed by a cover fastened to top plate 103, the body and top plate being secured together by screws or in any other suitable manner. The guide tube rests in recesses formed in the brackets 11, and the top plate has formed thereon lugs 104 which enter corresponding recesses in the plate 13 and are secured in position by means of screws 105. The guide tube may have additional screws extending into the brackets 11 as shown in Fig. 13. The tube so formed receives a pair of guide bars 106 having at each end threaded lugs 107 adapted to receive right and left screws 108 secured against endwise movement in the lugs 104 and having square ends 109 adapted to receive a key. By means of this construction the plates 106 can be adjusted toward and from each other for different width straps. The plates 106 are cut away opposite the cutter 76 as shown at 110. The cover 103 is formed with a tongue 111 to provide a coöperating die for the cutter 76, but this tongue may be formed in part of a separate hardened plate set into the cover 103. The tongue bears against and is in part supported against the lower face of a bearing lug 116 on the plate 13. The body 102 and the cover 103 are provided with tongues 112 which project between the flanges 33 of the creasing rolls. These tongues are beveled as shown in Fig. 4 so that they may extend up close to the roll surfaces. The tube is provided with springs 113 which are adapted to hold the strap against the cover plate 103. The guide tube is set so that its lower inside face will be on the level with the top of the stationary roll 31, thereby permitting free vertical movement of the creasing roll 32. The guide tube is slotted as shown so as to receive the different punches and anvils, and so as to permit adjustment of these parts. The right hand bracket 11 has formed thereon a lug 114 supporting an edged blade 115 which bears against the upper creasing roll and separates the strap therefrom. The guide tube can be adjusted to straps of different widths by adjusting the screws 108 with a key, while the springs 113 will adjust themselves to the different thicknesses of straps.

*The driving mechanism.*—Referring to Figs. 1, 2, 3, 5, 7 and 14, 120 designates a main drive shaft which has a belt pulley 121 loosely mounted thereon. This pulley is provided with a clutch member 122 adapted to coöperate with the clutch member 123 splined on the shaft. The clutch member 122 is provided with one or more pins 124 adapted to coöperate with one or more recesses in the clutch member 123. The clutch member 123 is provided with a pin 125 adapted to coöperate with a clutch arm 126 pivoted at 127 on the bracket 15. This clutch arm is provided with an inclined face and with a stop shoulder so as to move the clutch member 123 away from and out of engagement with the clutch member 122, when this arm is thrown to the position shown in Figs. 2, 3 and 7. The clutch member 123 is moved into engagement with the clutch member 122 by means of a spring (not shown). This clutch mechanism is of well known construction and need not be described in detail. It operates to automatically disconnect the drive shaft from the pulley and stop it in a predetermined position with the pin 125 in engagement with the shoulder on the clutch arm 126. The clutch member 122 is formed to receive a belt 128 passing over the belt pulley 129 on the shaft 20 at the right of the machine, so that the feeding and creasing mechanism will be constantly in operation, except, during the operation of the drive shaft as hereinafter described.

The drive shaft 120 has a gear 130 meshing with a gear 131 on a shaft 132 mounted in the brackets 15 and 16, and the gear 131 in turn meshes with a gear 133 on a shaft 134 also mounted in the brackets. The gears 131 and 133 are of the same diameter, while the diameter of the gear 130 is one half that of 131 and 133, so that the shafts 132 and 134 are driven at one half of the speed of the main drive shaft 120. The shaft 134 has fixed thereto a cam wheel 135 having a face cam groove receiving a cam roll 136 on the carrier 64. The shaft 132 has fixed thereto a cam wheel 137 having a face cam groove receiving a cam roll 138 on the carrier 89. The shaft 134 also has a cam 139 which engages a cam roll 140 on the lever 37 for the left hand creasing mechanism, while the shaft 132 has a cam 141 engaging a cam roll 142 on the lever 37 for the right hand creasing mechanism.

Rotation of the shaft 120 in the direction of the arrow, Fig. 2, will drive the shafts 132 and 134 in the direction of the arrows. A single complete revolution of the shaft 120 will rotate the shafts 132 and 134 each through a one half revolution. On referring to Fig. 2 and starting with the position of parts there shown, it will be seen that during the first revolution of the shaft 120 the carrier 64 will be given one full reciprocation while the carrier 89 will remain stationary; during the second revolution of the shaft 120 however the carrier 89 will be given a full reciprocation while the carrier 64 will remain stationary. During the first revolution of the shaft 120 the cam 139 will engage the cam roll 140 to raise the left hand creasing roll 32, and therefore interrupt its feeding action during the reciprocation of the carrier 64; while during the second revolution of the shaft 120 and during the reciprocation of the slide 89 the right hand creasing roll 32 will be raised to interrupt its feeding action. It will thus be seen that during the operation of the machine the carriers 64 and 89 will be reciprocated successively and during alternate revolutions of the main drive shaft 120.

*The controlling mechanism.*—Referring now to Figs. 1, 2, 3, 4, 7, 8 and 9, the clutch arm 126 has connected thereto an arm 150 having a pin and slot connection with the forked end 151 of a plunger 152 mounted to slide in a vertical bearing 153 on the bracket 15. This plunger has a strong spring 154 thereon which bears at one end against the bearing 153 and at its other end against a collar 155 on the plunger. This spring normally tends to depress the plunger and throw the arm 126 out of the path of the pin 125 on the clutch member 123. The plunger is retained in raised position by means of a latching lever 156 pivoted at 157 on the bracket 15 and engaging a shoulder 158 on the plunger. The latching lever 156 normally latches the plunger in raised position and this lever is normally retained in latched position by means of a spring 159. The cutter 76 is hollow and has positioned therein a roll 160 mounted on arms 161 pivoted at 162 to the body 102 of the guide tube, and these arms 161 are connected by a cross member 163 bearing on the rounded end of a plunger 164 which extends through and is guided by the hollow cutter carrier 75. The lower end of the plunger 164 has a pin and slot connection with one end of a tripping lever 165 pivoted at 166 on the base plate 10. The other end of the tripping lever is provided with inclined faces 167 and 168 adapted to engage a pin 169 on the latching lever 156. A spring 170 connected at one end to the bracket 15 and at its other end to the tripping lever normally tends to hold the parts in position as shown in full lines in Figs. 7, 8 and 9, with the roll 160 in raised position, the plunger 164 in raised position and with the inclined face 167 below the pin 169. When the parts are in this position with the inclined face 167 of the tripping lever below the pin 169, the latching lever 156 is permitted to engage the plunger 152 and hold this plunger in raised position against the tension of its spring 154. The roll 160 is preferably smooth so as not to mar the finished face of the strap but both rolls 160 and 171 may be knurled.

A knurled roll 171 is splined to a shaft 172 mounted in the bearing lug 116 extending across the plate 13, and having rigidly secured thereto a clutch member 173 adapted to coöperate with a clutch member 174 loosely mounted on the shaft 172 and connected by a belt 175 with a pulley 176 on the shaft 20 on the right hand side of the machine. The clutch member 174 is retained against endwise movement by a plate 177 bolted to the plate 13, and one of the clutch members 173 and 174 may be provided with a leather facing 178. The shaft 172 is provided with a conical head 179, and a spring 180 is mounted on this shaft between the head and the roll 171, which spring normally operates to hold the clutch members 173 and 174 in clutching engagement. The shaft 172 is slid endwise to move the clutch members 173 and 174 out of engagement, by means of an inclined cam face 181 on a bracket 182 secured to the carrier 75 and adapted to engage the head 179 during the upward movement of this carrier.

An arm 183 is pivoted intermediate its ends on the bracket 15 and is connected at one end to the plunger 152, and is provided at its other end with a cam roll 184 adapted to be engaged by a cam rise 185 on the clutch member 122.

If a strap or the like is moved into the bite of the rolls 160 and 171, which latter roll projects a slight distance below the plate 103, the roll 160 will be moved downwardly, Figs. 4, 7 and 9. This will operate to depress the plunger 164 which will in turn move the tripping lever 165 to dotted line position Fig. 7 against the tension of its spring 170. When the left hand end of the tripping lever moves upwardly the inclined face 167 will by camming engagement with the pin 169 swing the latching lever 156 on its pivot and throw it out of engagement with the plunger 152. The plunger being now released will under the tension of its spring 154 move the clutch member 126 out of the path of the pin 125 so as to permit the clutch members 122 and 123 to engage and rotate the shaft. The parts are so constructed that for the smallest thickness of stock, the end of the tripping lever will be moved clear of the pin 169 when the stock is between the rolls 160 and 171, so that the end of the latching lever 156 will be yieldingly pressed against the side of the plunger 152 after the tripping lever has tripped it. During the revolution of the shaft 120, and before this shaft has made a complete revolution, the cam 185 will engage the cam roll 184 thereby raising the plunger 152 against the tension of its spring 154, and this plunger will be automatically latched in raised position by the latching lever 156. This movement of the plunger will throw the arm 126 into the path of the pin 125, so that the clutch members 123 and 122 will be separated at the end of a complete revolution and the shaft 120 stopped with the pin 125 against the shoulder on the arm 126. If the material be now removed from between the rolls 160 and 171, the roll 160 and the plunger as well as the tripping lever 165 will be automatically returned to full line position through the spring 170, and as the left end of the tripping lever moves downwardly the inclined face 168 will engage the pin 169 to again trip the lever 156 and start the machine. In this case also the shaft stops after a complete revolution. It will thus be seen that the movement of the roll 160 either toward or from the roll 171 will cause a single revolution of the main drive shaft. It will also be seen that if we start with the position of parts shown in the drawings, that a downward movement of the roll 160 will cause a reciprocation of the carrier 64, while an upward movement will cause a reciprocation of the carrier 89.

*Operation.*—Assuming now that a strap as shown in Fig. 15 is to be produced. This strap is passed into the tube 100 into the bite of the left hand creasing rolls 31 and 32. These creasing rolls operate both to crease and feed the material through the machine. The strap after leaving the creasing rolls enters the guide tube and is retained against the upper wall thereof by the springs 113. During this time only the creasing rolls are in operation as they are driven continuously from the clutch member 122. As soon as the front end of the strap enters the bite of the rolls 160 and 171 the clutch will be thrown to cause the carrier 64 to reciprocate and thereby cause the cutter 76 to trim the forward end of the strap at $b$ and cause the punches 68 to punch the holes $c$ (Fig. 15). During the reciprocation of the carrier 64 the cam 139 will raise the upper left hand creasing roll 32, while the cam face 181 will engage the head 179 and stop the rotation of the shaft 172, so as to interrupt the feed of the strap during the operation of the trimming cutter and the punches. It will be understood that the lost motion and interval of time, between the engagement of the end of the strap with the rolls 160 and 171 and the actual starting of the machine and the engagement of the punches and trimming cutter with the strap, will be sufficient to cause the end of the strap to be fed slightly beyond the forward end of the trimming cutter 76 before this cutter engages the strap. As soon as the end trimming cutter and the punches have completed their cutting operation the left creasing rolls 32 will again be thrown into engagement with the work and the shaft 172 will again be engaged and thrown into operation so that the strap will again be fed forward. As the rear end of the strap leaves the rolls 160 and 171 the clutch will again be operated to this time cause the carrier 89 to be reciprocated to form the slot $d$ in the rear end of the strap. During the operation of the carrier 89 the right hand creasing rolls are thrown out of operation to interrupt the feed of the strap engaged thereby, while the left hand creasing rolls remain in operation to feed the strap engaged thereby.

It will thus be seen that in this machine the trimming, punching and slotting mechanism will be operated automatically to trim and punch holes in the forward end of the strap, and form an elongated slot in the rear end of the strap. It will also be noted that since the operations are performed at predetermined distances from the ends of the strap by mechanisms governed by the strap itself, and more especially by the ends thereof, the operations can be performed on straps irrespective of their lengths. In view of the fact that the operations are performed automatically it is necessary for the operator to simply feed the straps to the machine, which requires no skill whatever so that the work can be performed by unskilled labor. The machine can be run at a very high speed whereby the machine of this invention has a very high capacity. In view of the fact that the mechanism is operated and controlled by means engaging the ends of the strap, the mechanism can be very much condensed and it is not necessary to place these mechanisms in a line along the machine a distance equal to the total length of the longest strap. The controlling mechanism is very positive in its operation. The member in the path of the strap is not in this case moved by pushing the strap from a point removed from its end, which would cause buckling of thin straps, but the roll 160 is moved by the strap moving into the bite of the rolls 160 and 171, so that the roll 160 is moved positively through the roll 171. By placing supplemental creasing rolls at the forward end of the machine it is found that the strap will have a more finished appearance.

In practice it is not necessary to vary the position of the end of the strap with respect to the forward end trimming cutter. It is however necessary to vary the spacing of the punched holes and the distance between the forward punched hole and the forward end of the strap. It is also necessary to vary the distance of the elongated slot with respect to the rear end of the strap. This can be accomplished in this machine in the manner heretofore described, in that the punches and the slotter are arranged for adjustment toward and from the end trimming cutter and therefore toward and from the controlling mechanism. The machine can therefore be adjusted for any desired length, width and thickness of strap, and in accordance with any desired arrangement of the punched and slotted holes. The machine may be provided with suitable scales, which need not however be described in detail since they involve mere mechanical skill.

It is obvious that various changes may be made in the details of construction without departing from the spirit of this invention and it is therefore to be understood that this invention is not to be limited to the specific construction shown and described.

Having thus described the invention what is claimed is:

1. In a machine of the class described, the combination with strap supporting means, of means for operating on the strap, and mechanism for controlling the operation of said operating means constructed and arranged to cause said operating means to operate on the strap body between its ends and at a predetermined position with respect to a predetermined point on the strap.

2. In a machine of the class described, the combination with strap supporting means, of means for operating on the strap, and mechanism for controlling the operation of said operating means, constructed and arranged to cause said operating means to operate on the strap body between its ends and at a predetermined distance from one end of the strap.

3. In a machine of the class described, the combination with strap supporting means, of means for operating on the strap, and mechanism for controlling the operation of said operating means, constructed and arranged to cause said operating means to operate on the strap body between its ends and at predetermined positions with respect to a predetermined point on the strap.

4. In a machine of the class described, the combination with strap supporting means, of means for operating on the strap, and mechanism for controlling the operation of said operating means, constructed and arranged to cause said operating means to operate on the strap body between its ends and at predetermined distances from one end of the strap.

5. In a machine of the class described, the combination with strap supporting means, of means for operating on the strap, and mechanism for controlling the operation of said operating means, constructed and arranged to cause said operating means to operate on the strap at predetermined distances from the ends of the strap.

6. In a machine of the class described, the combination with strap supporting means, of means for operating on the strap, mechanism for controlling the operation of said operating means, constructed and arranged to cause said operating means to operate on the strap body between its ends and at a predetermined distance from one end of the strap, and adjusting means for varying said predetermined distance.

7. In a machine of the class described, the combination with strap supporting means, of means for operating on the strap, mechanism for controlling the operation of said operating means, constructed and arranged to cause said operating means to operate on the strap at predetermined distances from the ends of the strap, and adjusting means for varying said predetermined distances.

8. In a machine of the class described, the combination with strap supporting and feeding means, of means for operating on the strap, and mechanism for automatically controlling the operation of said operating means, constructed and arranged to cause said operating means to operate on the strap body between its ends when a predetermined point on the strap reaches a predetermined position with respect to said operating means.

9. In a machine of the class described, the combination with strap supporting and feeding means, of means for operating on the strap, and mechanism for automatically controlling the operation of said operating means, constructed and arranged to cause said operating means to operate on the strap when the ends of the strap reach predetermined positions with respect to said operating means.

10. In a machine of the class described, the combination with means for feeding a strap endwise, of means for operating on the strap, and mechanism controlled by the engagement of the strap therewith, constructed and arranged to cause said operating means to operate on the strap body between its ends at a predetermined position with respect to a predetermined point on the strap.

11. In a machine of the class described, the combination with means for feeding a strap endwise, of means for operating on the strap, and mechanism controlled by the engagement of the ends of the strap therewith, constructed and arranged to cause said operating means to operate on the strap at predetermined distances from the ends thereof.

12. In a machine of the class described, the combination with means for feeding a strap endwise, of means for operating on the strap, and mechanism controlled by the engagement of the end of the strap therewith, constructed and arranged to cause said operating means to operate on the strap body between its ends and at predetermined distances from the end thereof.

13. In a machine of the class described, the combination with strap supporting and feeding means, of a plurality of devices for operating on the strap, and mechanism for automatically controlling said devices, constructed and arranged to cause said devices to operate on the strap at predetermined positions with respect to a predetermined point on the strap.

14. In a machine of the class described, the combination with strap supporting and feeding means, of a plurality of devices for operating on the strap, mechanism for automatically controlling said devices, constructed and arranged to cause said devices to operate on the strap at predetermined positions with respect to a predetermined point on the strap, and adjusting means for initially adjusting the relation of said predetermined positions with respect to said predetermined point.

15. In a machine of the class described, the combination with strap supporting and feeding means, of a plurality of devices for operating on the strap, and mechanism for automatically controlling said devices, constructed and arranged to cause one of said devices to operate on the strap at a predetermined distance from one end thereof, and cause another of said devices to operate on the strap at a predetermined distance from the other end thereof.

16. In a machine of the class described, the combination with strap supporting and feeding means, of a plurality of devices for operating on the strap, and mechanism for automatically controlling said devices, constructed and arranged to cause said devices to operate on the strap at predetermined distances from one end thereof.

17. In a machine of the class described, the combination with strap supporting and feeding means, of strap operating means comprising a plurality of operating elements adapted to engage and operate on the strap, and means for automatically controlling said strap operating means, constructed and arranged to cause said elements to engage and operate on the strap at predetermined positions with respect to the end of the strap.

18. In a machine of the class described, the combination with strap supporting and feeding means, of strap operating means comprising a plurality of operating elements adapted to engage and operate on the strap, means for automatically controlling said strap operating means, constructed and arranged to cause said elements to engage and operate on the strap at predetermined positions with respect to the end of the strap, and adjusting means constructed and arranged to initially adjust the relation of the points of operation of said elements collectively with respect to the end of the strap.

19. In a machine of the class described, the combination with strap supporting and feeding means, of strap operating means comprising a plurality of operating elements adapted to engage and operate on the strap, means for automatically controlling said strap operating means, constructed and arranged to cause said elements to engage and operate on the strap at predetermined positions with respect to the end of the strap, and adjusting means constructed and arranged to initially adjust the relation of the points of operation of said elements individually and collectively with respect to the end of the strap.

20. In a machine of the class described, the combination with means for feeding a strap endwise, of a plurality of devices for operating on a strap, mechanism for automatically controlling said devices constructed and arranged to cause said devices to operate on the strap in a predetermined relation with respect to the end thereof; and means for shifting said devices relatively to said controlling mechanism along the strap.

21. In a machine of the class described, the combination with means for feeding a strap endwise, of a device for operating on the strap body between its ends, and controlling mechanism for said device including a member in the path of the strap and moved thereby.

22. In a machine of the class described, the combination with means for feeding a strap endwise, of a device for operating on the strap body between its ends, and controlling mechanism for said device including a movable member in the path of the strap, together with means for moving said member through the strap when it engages said member.

23. In a machine of the class described, the combination with means for feeding a strap endwise, of a device for operating on the strap, and controlling mechanism for said device including a movable member in the path of the strap, together with means gripping the strap constructed and arranged to move said member through said strap.

24. In a machine of the class described, the combination with means for feeding a strap endwise, of a device for operating on the strap, and controlling mechanism for said device including a movable member in the path of the strap, together with a feeding roll constructed and arranged to coöperate with said member to grip the strap therebetween and move said member.

25. In a machine of the class described, the combination with means for feeding a strap endwise, of a device for operating on the strap, and controlling mechanism for said device including a pair of coöperating rolls in the path of the strap, together with means for movably supporting one of said rolls.

26. In a machine of the class described, the combination with means for feeding a strap endwise, of a device for operating on the strap, and controlling mechanism for said device including a pair of coöperating rolls in the path of the strap, together with means for movably supporting one of said rolls, and for rotating the other roll.

27. In a machine of the class described, the combination with means for feeding a strap endwise, of a device for operating on one end of a strap, a device for operating on the strap intermediate its ends, and controlling mechanism for said devices constructed and arranged to cause said first device to operate on the strap at a fixed distance from its end and cause the other device to operate on the strap at variable distances from its end.

28. In a machine of the class described, the combination with means for feeding a strap endwise, of a device for operating on one end of a strap, a device for operating on the strap intermediate its ends, and controlling mechanism for said devices including a member in the path of the strap positioned in fixed relation with respect to said first device.

29. In a machine of the class described, the combination with means for feeding a strap endwise, of means for operating on the front end of the strap, means for operating on the rear end of the strap, and mechanism for automatically controlling the operation of said operating means, positioned intermediate said operating means.

30. In a machine of the class described, the combination with means for feeding a strap endwise, of means for operating on the front end of the strap, means for operating on the rear end of the strap, and controlling mechanism for said operating means constructed and arranged to cause said operating means to be operated alternately.

31. In a machine of the class described, the combination with means for feeding a strap endwise, of means for operating on the front end of the strap, means comprising a series of operating elements for operating on the strap intermediate its ends, and means for operating on the rear end of the strap.

32. In a machine of the class described, the combination with means for feeding a strap endwise, of means for operating on the front end of the strap, means comprising a series of operating elements for operating on the strap intermediate its ends, and means for adjusting the elements of said second operating means toward and from each other, and for adjusting said elements collectively relatively to said first operating means along the strap.

33. In a machine of the class described, the combination with means for feeding a strap endwise, of a plurality of devices for operating upon the strap in succession, and means for interrupting the feed of the strap while either of said operating means operate upon the strap.

34. In a machine of the class described, the combination with a plurality of sets of feed rolls for feeding a strap lengthwise, of a plurality of devices adapted to operate successively upon the strap, and means for interrupting the feeding action of said feed rolls successively.

35. In a machine of the class described, the combination with means for supporting a strap for endwise movement, of means for operating on the strap, and creasing means forwardly and rearwardly of said operating means.

36. In a machine of the class described, the combination with means for supporting a strap for endwise movement, of creasing means engaging the strap, and means for trimming the forward end of the strap, positioned forwardly of said creasing means and controlled by feeding of the strap.

37. In a machine of the class described, the combination with means for supporting a strap for endwise movement, of creasing means engaging the strap, and a multiple perforating punch positioned forwardly of said creasing means and controlled by feeding of the strap.

38. In a machine of the class described, the combination with means for supporting a strap for endwise movement, of creasing means engaging the strap, and means for slotting the rear end of the strap, positioned forwardly of said creasing means and controlled by feeding of the strap.

39. In a machine of the class described, the combination with means for supporting a strap for endwise movement, of creasing means engaging the strap, and a multiple perforating punch arranged to operate on the strap body between its ends, means for trimming the forward end of the strap, and means for slotting the rear end of the strap, all positioned forwardly of said creasing means.

40. In a machine of the class described, the combination with means for supporting a strap for endwise movement, of creasing means engaging the strap, and a multiple perforating punch, means for trimming the forward end of the strap, and means for slotting the rear end of the strap, and supplemental creasing means, all positioned forwardly of said creasing means.

41. In a machine of the class described, the combination with means for feeding a strap endwise, of means for trimming the front end of the strap, and means for slotting the rear end of the strap, positioned forwardly of said trimming means and controlled by exit of the strap from the feeding means.

42. In a machine of the class described, the combination with means for feeding a strap endwise, of means for trimming the front end of the strap, means for slotting the rear end of the strap, positioned forwardly of said trimming means, and means for perforating the strap, positioned rearwardly of said trimming means.

43. In a machine of the class described, the combination with means for feeding a strap endwise, of means for trimming the front end of the strap, and a plurality of punch elements for perforating the strap controlled by feeding of the strap.

44. In a machine of the class described, the combination with means for feeding a strap endwise, of means for trimming the front end of the strap, a plurality of punch elements for perforating the strap controlled by feeding of the strap, and means for adjusting said punch elements toward and from each other and collectively toward and from said trimming means.

45. In a machine of the class described, a series of punch supports, a series of die supports, and means for simultaneously adjusting the individual supports of each series laterally toward and from each other in a straight line and for adjusting said supports collectively toward and from a given point along said line.

46. In a machine of the class described, a series of punch supports each carrying a punch, a series of die supports each carrying a die coöperating with a corresponding punch, and means connected to both series of supports constructed and arranged to simultaneously adjust the supports of each series relatively and laterally toward and from each other in a straight line.

47. In a machine of the class described, a series of punch supports each carrying a punch, a series of die supports each carrying a die coöperating with a corresponding punch, and means connected to both series of supports constructed and arranged to simultaneously adjust the sets of punches and dies toward and from each other, and means for adjusting said supports collectively.

48. In a machine of the class described, the combination with means for supporting a strap, of a cutter for trimming the front end of the strap, and controlling mechanism having a member positioned within said cutter.

49. In a machine of the class described, the combination with means for supporting a strap, of a cutter for trimming the front end of the strap, controlling mechanism, and a member movable with said cutter for interrupting the action of said controlling mechanism.

50. In a machine of the class described, the combination with means for supporting a strap, a device for slotting the end of the strap comprising a support, a carrier for said support, and means for adjusting said support in said carrier along the strap.

51. In a machine of the class described, the combination with means for feeding a strap endwise, of means for perforating the strap, and controlling means for said perforating means including a member in the path of the strap positioned forwardly of said perforating means.

52. In a machine of the class described, the combination with means for feeding a strap endwise, of means for slotting the rear end of the strap, and controlling means for said slotting means including a member in the path of the strap positioned rearwardly of said slotting means.

53. In a machine of the class described, the combination with means for feeding a strap endwise, of means for trimming the forward end of the strap, and controlling means for said trimming means including a member in the path of the strap positioned adjacent said trimming means.

54. In a machine of the class described, the combination with means for feeding a strap endwise, of means for operating on the strap, driving means for said operating means including a clutch, and a member in the path of the strap and actuated thereby for controlling said clutch.

55. In a machine of the class described, the combination with means for feeding a strap endwise, of means for operating on the strap, driving means for said operating means including a clutch, a spring for tripping said clutch, a member in the path of the strap for tripping said spring, and a cam for tensioning said spring.

In testimony whereof I affix my signature in the presence of these two witnesses.

ARTHUR J. BRAUER.

Witnesses:
J. H. BRUNINGA,
GERTRUDE A. HEYMANN.

Copies of this patent may be obtained for five cents each, by addressing the "Commissioner of Patents, Washington, D. C."